US009028782B2

(12) United States Patent
Senior et al.

(10) Patent No.: US 9,028,782 B2
(45) Date of Patent: May 12, 2015

(54) PROCESSING NICKEL BEARING SULPHIDES

(75) Inventors: Geoffery David Senior, Perth (AU); Brendan Pyke, Perth (AU); Brian Judd, Perth (AU)

(73) Assignee: BHP Billiton SSM Development Pty Ltd., Melbourne, Victoria (AU)

( * ) Notice: Subject to any disclaimer, the term of this patent is extended or adjusted under 35 U.S.C. 154(b) by 1225 days.

(21) Appl. No.: 12/812,319

(22) PCT Filed: Jan. 9, 2009

(86) PCT No.: PCT/AU2009/000026

§ 371 (c)(1),
(2), (4) Date: Nov. 1, 2010

(87) PCT Pub. No.: WO2009/086606

PCT Pub. Date: Jul. 16, 2009

(65) Prior Publication Data

US 2011/0039477 A1 Feb. 17, 2011

(30) Foreign Application Priority Data

Jan. 9, 2008 (AU) ................................ 2008900099

(51) Int. Cl.

| | |
|---|---|
| ***C01G 1/00*** | (2006.01) |
| ***C01G 49/00*** | (2006.01) |
| ***C22B 1/00*** | (2006.01) |
| ***B03D 1/002*** | (2006.01) |
| ***B03D 1/02*** | (2006.01) |
| ***C22B 23/00*** | (2006.01) |

(52) U.S. Cl.

CPC . *C22B 1/00* (2013.01); *B03D 1/002* (2013.01); *B03D 1/02* (2013.01); *C22B 23/005* (2013.01)

(58) Field of Classification Search

CPC .......... B24B 1/00; B03D 103/02; B03D 1/02; B03D 1/012; B03D 1/025; B03D 1/087; C01G 53/11; B01D 11/01; C22B 1/00; C22B 23/005

USPC .......... 209/3.3, 162; 210/787, 800, 703, 704; 241/301, 24.13; 422/261; 423/138, 423/561.1; 451/36

See application file for complete search history.

(56) References Cited

U.S. PATENT DOCUMENTS

| | | | | |
|---|---|---|---|---|
| 2,919,802 | A * | 1/1960 | Drake | 209/167 |
| 5,795,466 | A * | 8/1998 | Kelebek et al. | 209/166 |
| 5,914,034 | A * | 6/1999 | Ding et al. | 210/221.2 |
| 6,036,025 | A * | 3/2000 | Clark et al. | 209/164 |
| 6,170,669 | B1 * | 1/2001 | Senior et al. | 209/166 |
| 6,945,407 | B2 * | 9/2005 | Senior | 209/164 |
| 7,314,139 | B2 * | 1/2008 | Senior et al. | 209/166 |
| 7,753,212 | B2 * | 7/2010 | Pyke et al. | 209/166 |
| 8,753,593 | B2 * | 6/2014 | Senior et al. | 423/138 |
| 2004/0101458 | A1 * | 5/2004 | Senior | 423/140 |

FOREIGN PATENT DOCUMENTS

| | | |
|---|---|---|
| WO | WO 93/04783 | 3/1993 |
| WO | WO 2009/086607 | 7/2009 |

* cited by examiner

*Primary Examiner* — Timothy V Eley
(74) *Attorney, Agent, or Firm* — Brinks Gilson & Lione; G. Peter Nichols

(57) ABSTRACT

The present invention provides a method of separating nickel bearing sulphides from mined ores or concentrates of mined ores that contain talc particles is disclosed. The method comprises adjusting the Eh of a slurry of mined ores or concentrates of mined ores and making particles of nickel bearing sulphides less hydrophobic than talc particles and floating the nickel bearing sulphide particles from the slurry.

20 Claims, 1 Drawing Sheet

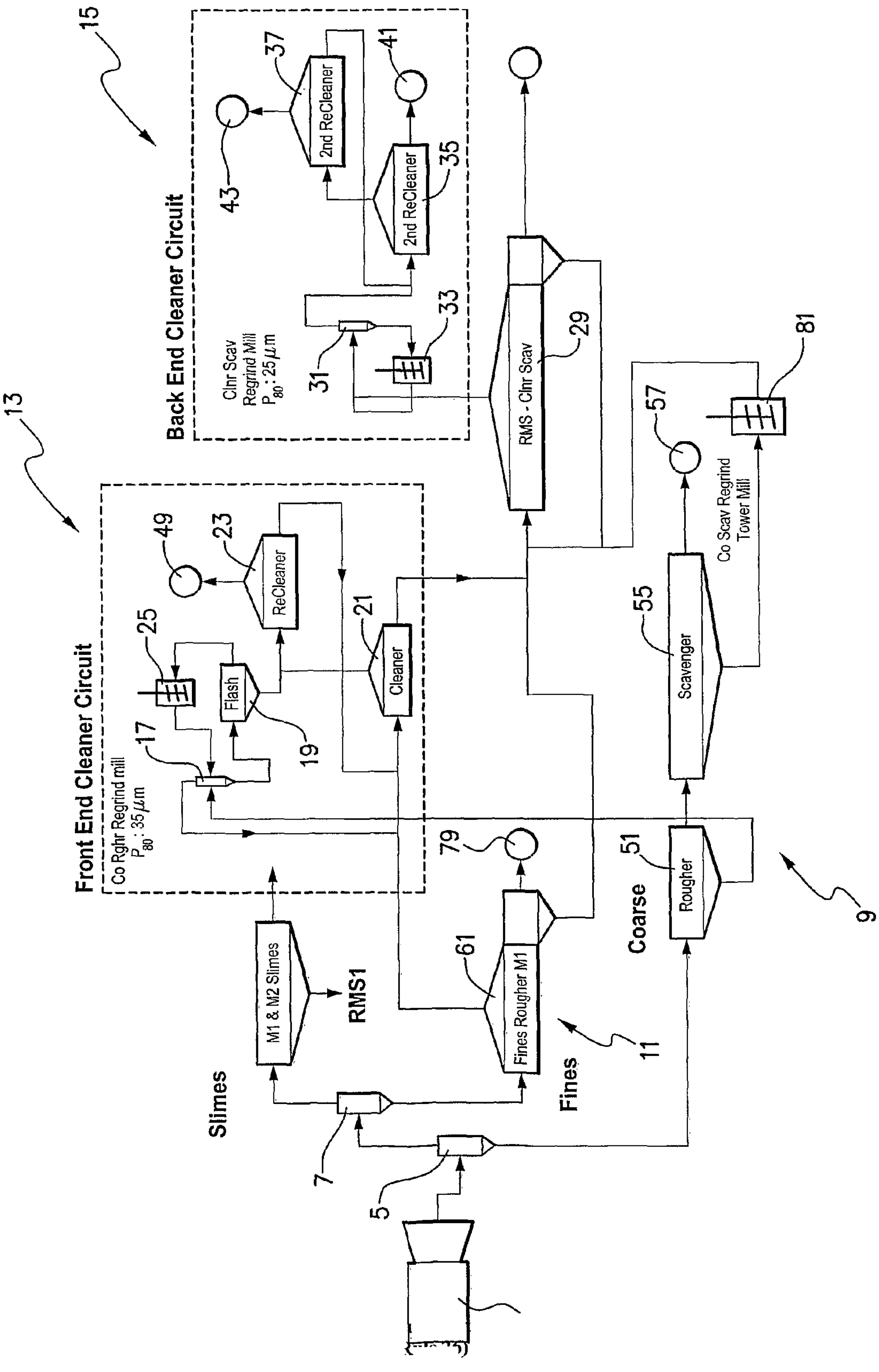
15
13
Back End Cleaner Circuit
Front End Cleaner Circuit
2nd ReCleaner
2nd ReCleaner
Clnr Scav
Regrind Mill
$P_{80}$ : 25 μm
RMS - Clnr Scav
Co Rghr Regrind mill
$P_{80}$ : 35 μm
Flash
ReCleaner
Cleaner
Scavenger
Co Scav Regrind
Tower Mill
Rougher
Coarse
Fines Rougher M1
Fines
M1 & M2 Slimes
RMS1
Slimes
37
41
43
35
33
31
29
81
57
55
49
23
25
21
17
19
79
61
51
9
11
7
5

PROCESSING NICKEL BEARING SULPHIDES

This application claims the priority to PCT Application Serial No. PCT/AU2009/000026 filed Jan. 9, 2009, published in English on Jul. 16, 2009 as PCT WO 2009/086606 and to Australian Application No. 2008/900099 filed Jan. 9, 2008, the entire contents of each are incorporated herein by reference.

The present invention relates to a method for separating nickel bearing sulphides from mined ores or concentrates of mined ores.

The present invention relates more particularly to a hydrometallurgical method for separating nickel bearing sulphides from mined ores or concentrates of mined ores.

The present invention relates more particularly to a hydrometallurgical method for separating nickel bearing sulphides from mined ores or concentrates of mined ores that includes froth flotation of nickel bearing sulphide minerals from a slurry of talc-containing mined ores or concentrates of mined ores.

The term "nickel bearing sulphides" is understood herein to include nickel sulphides and nickel iron sulphides. Examples of nickel bearing sulphides include the minerals pentlandite, millerite and violarite.

The present invention was made during the course of research and development work in relation to the Mount Keith nickel deposit of the applicant.

The Mount Keith deposit was developed in the early 1990's. The deposit contains nickel bearing sulphides. At the time, it was a major challenge to find a processing route that could treat such low grade nickel ore and produce a quality concentrate for treatment in two existing smelters in Australia and Finland. The process that was developed at that time and that is operated at the mine treats up to 90% of the mined ore. The remaining 10% or thereabouts of the ore, which contains high levels of talcose ore, could not be processed into an acceptable concentrate due to the presence of talc. The talcose ore occurs as discrete veins within the ore body. The talcose ore that has been mined to date has been stockpiled at the mine.

Processing the talcose ore at the Mount Keith mine and separating nickel bearing sulphides from the ore is an important objective.

Moreover, the issue of processing talcose ores is not confined to the Mount Keith mine and is also an issue for a number of other deposits in Australia and elsewhere.

The research and development work carried out by the applicant made the following significant findings.

1. Lowering Eh, for example by the addition of sodium dithionite, makes nickel sulphide ores less hydrophobic compared to talc particles, with a result that guar selectively coats on talc rather than on nickel sulphides, and thereafter raising Eh, for example by adding air, and thereby improving the flotability of nickel sulphide minerals allows nickel sulphide ores to float selectively, with the talc particles remaining in the pulp. The effect of guar (as with other such surface modifying agents) is to cause guar-coated talc particles to flocc together, thereby depressing the floatability of the talc particles. The ability of guar to change the surface properties of talc particles is well known. However, the applicant found that guar was much less effective for Mount Keith ore types. The applicant found that guar interacts hydrophobically with talc and nickel sulphides under natural flotation conditions. Hence, guar coats on both talc and nickel sulphides under natural flotation conditions, with a result that guar has the same effect on talc and nickel sulphides and does not facilitate separating talc and nickel sulphides under natural flotation conditions. The above-described Eh adjustment makes it possible to use guar to depress talc flotation and allow selective nickel sulphide ore flotation.
2. The applicant found that sequenced re-grinding of selected froth products, as described herein, brought about unexpectedly large improvements in talc rejection from flotation concentrates and hence improved significantly the separation of talc and nickel sulphides. The applicant found that only part of the surface of talc particles causes the particles to attach to air bubbles (i.e. to act hydrophobically), and re-grinding talc particles after an initial grinding step (carried out for example when preparing the particles for flotation) increases the proportion of the talc surface that has no tendency for such attachment. Consequently, re-grinding the talc particles increases the hydrophilic characteristics of talc and thus makes the talc particles less floatable than nickel sulphide minerals, for example under natural flotation conditions. The term "sequenced re-grinding" is understood herein to mean that the method includes a series of re-grinding steps on particles in process streams carried out at different stages of the method after an initial grinding step, whereby particles are subjected to more than one grinding operation.

The subject specification relates to the first of the above findings.

In broad terms the present invention provides a method of separating nickel bearing sulphides from mined ores or concentrates of mined ores that contain talc particles, the method comprising at least one flotation stage comprising adjusting the Eh of a slurry of mined ores or concentrates of mined ores and making particles of nickel bearing sulphides in the ores or concentrates less hydrophobic than talc particles in the ores or concentrates, and floating the nickel bearing sulphide particles from the slurry.

According to the present invention there is provided a method of separating nickel bearing sulphides from mined ores or concentrates of mined ores that contain talc particles, the method comprising at least one flotation stage comprising adjusting the Eh of a slurry of mined ores or concentrates of mined ores and making particles of nickel bearing sulphides in the ores or concentrates less hydrophobic than talc particles in the ores or concentrates, adding a surface modifying agent as described herein to the slurry and coating talc particles and not nickel bearing sulphide particles with the surface modifying agent, and floating the nickel bearing sulphide particles from the slurry while retaining the talc particles in the slurry.

The ores or ore concentrates may comprise talc ores or ore concentrates only or a mixture of non-talc and talc ores and ore concentrates.

The term "surface modifying agent" is understood herein to mean a reagent that depresses flotation of the particles on which the reagent is coated. Such surface modifying agents include, by way of example, guar (including chemically-modified guar), polysaccharides (such as dextrin), and synthetically manufactured polymers having required properties.

A preferred surface modifying agent is guar.

Preferably the step of adding the surface modifying agent to the slurry comprises adding an acid with the surface modifying agent to adjust the pH of the slurry to improve the flotation rate in the subsequent flotation step.

Preferably the method comprises making nickel bearing sulphides in the ores or concentrates less hydrophobic by decreasing the Eh of the slurry.

Preferably the method comprises decreasing the Eh of the slurry by adding a reducing agent to the slurry.

Preferably the reducing agent is an oxy-sulphur compound which dissociates in the slurry to form oxy-sulphur ions having the general formulae:

$$S_nO_y^{z-}$$

wherein n is greater than 1, y is greater than 2, and z is the valence of the ion.

Preferably the method comprises decreasing the Eh of the slurry by at least 100 mV, more preferably at least 200 mV.

Preferably the method comprises adjusting the Eh of the slurry after the addition of the surface modifying agent to the slurry and making particles of nickel bearing sulphides more hydrophobic and thereby improving the flotability of the particles.

Preferably the method comprises making particles of nickel bearing sulphides in the ores or concentrates more hydrophobic by increasing the Eh of the slurry.

Preferably the method comprises increasing the Eh of the slurry by supplying an oxidising agent to the slurry.

Preferably the oxidising agent is an oxygen-containing gas, typically air.

Preferably the method comprises increasing the Eh of the slurry by at least 100 mV, more preferably at least 200 mV.

The slurry may have any suitable solids loading.

Preferably the method comprises separating the slurry on the basis of particle size into a coarse particles stream and a fines particles stream and processing each process stream in the above-described flotation stage whereby the method comprises a coarse particles flotation stage and a fines particles flotation stage.

Preferably the fines particles stream comprises particles less than 40 μm.

Preferably the method comprises processing the coarse particles process stream and the fines particles process stream from the respective flotation stages in at least one cleaner circuit.

Preferably the method comprises processing the coarse particles process stream and the fines particles process streams in separate rougher stages with no recycling of concentrate or tailings to rougher cells.

Preferably the method comprises sequentially re-grinding particles, as described herein, in at least one of the process streams.

Preferably the method comprises cleaning a concentrate stream from rougher cells of the coarse particles flotation stage in a front end cleaning circuit.

Preferably the method comprises grinding particles in the concentrate stream from rougher cells of the coarse particles flotation stage prior to cleaning the concentrate stream in the front end cleaning circuit.

Preferably the grinding step comprises grinding particles to a P80 of 40 μm.

Preferably the method comprises cleaning a first part of a concentrate stream from rougher cells of the fines particles flotation stage in the front end cleaning circuit.

Preferably the method comprises cleaning a second part of the concentrate from rougher cells of the fines particles flotation stage in a back-end cleaning circuit.

Preferably the method comprises cleaning a tailings stream from scavenger cells of the coarse particles flotation stage in the back-end cleaning circuit.

Preferably the method comprises grinding particles in the concentrate stream from scavenger cells of the coarse particles flotation stage prior to cleaning the concentrate stream in the back-end cleaning circuit.

Preferably the grinding step comprises grinding particles to a P80 of 60 μm.

Preferably the method comprises cleaning a tailings stream from the front-end cleaning circuit in the back-end cleaning circuit.

Preferably the method comprises grinding in the back-end cleaning circuit a concentrate derived from any one or more of (i) the second part of the concentrate from rougher cells of the fines particles flotation stage, (ii) the tailings stream from scavenger cells of the coarse particles flotation stage, and (iii) the tailings stream from the front-end cleaning circuit prior to cleaning the concentrate in the back-end cleaning circuit.

Preferably the grinding step comprises grinding particles to a P80 of 25 μm.

According to the present invention there is also provided a plant for carrying out the above-described method.

The present invention is described further by way of example with reference to the accompanying FIGURE which is a flowsheet of one embodiment of a method of separating nickel bearing sulphide minerals from a mined ore in accordance with the invention.

With reference to the Figure , a 40% solids slurry of an ore containing nickel bearing sulphides is supplied to a cyclone 5 from a rod mill 3 and the slurry is separated on the basis of particle size into two streams. The ore in the slurry is run of mine ore that has been subject to size reduction by crushing and grinding operations.

An underflow stream, which has coarse particles, is processed in a series of flotation and cleaner stages described hereinafter.

An overflow stream is supplied to a second cyclone 7 and is separated on the basis of particle size into a fines underflow stream and a slimes overflow stream.

The fines particles underflow stream is processed in a series of flotation and cleaner stages described hereinafter.

The particle size cut-offs for the streams are as follows:

(a) coarse particles underflow stream—greater than 40 μm;

(b) fines particles underflow stream—less than 40 μm; and (c) slimes overflow stream—less than 10-15 μm The slimes overflow stream is pumped to a tailings dam.

There are four key stages of the treatment of the coarse particles underflow stream and the fines particles underflow stream in the flowsheet shown in the FIGURE .

By way of summary:

(a) a first stage is a coarse particles flotation stage 9 in which the coarse particles underflow stream from the cyclone 5 is pre-treated by adjusting the Eh of the stream by the addition of a reducing agent in the form of sodium dithionite and then processed in flotation cells at high density in the presence of sulphuric acid and a surface modifying agent in the form of guar;

(b) a second stage is a fine particles flotation stage 11 in which the fines particles underflow stream from the cyclone 7 is pre-treated by adjusting the Eh of the stream by the addition of sodium dithionite and then floated at low density in the presence of sulphuric acid, citric acid, and guar;

(c) a third stage is a “front-end” cleaning circuit 13 in which a rougher concentrate from the coarse particles flotation stage 9 is re-ground and then combined with a rougher concentrate from a first group of cells in the fine particles flotation stage 11 for cleaning in the presence of sulphuric acid and guar; and (d) a fourth stage is a “back-end” cleaning circuit 15 in which a flotation concentrate derived from (i) a scavenger concentrate from the coarse particles flotation stage 9, (ii) a rougher concentrate from the last group of cells in the fine particles flotation stage 11, and (iii) tailings from the front end cleaner 13 are re-ground before being cleaned in the presence of a combination of reagents including sulphuric acid and guar.

Each of the above stages and relevant operating conditions are discussed hereinafter in more detail.

Coarse Particles Flotation Stage 9

The coarse particles underflow stream from the cyclone 5 is first pre-treated by adjusting the Eh of the stream by the addition of sodium dithionite and then processed in rougher flotation cells 51 at high density in the presence of sulphuric acid and guar.

As is described above, the purpose of the dithionite addition is to lower the Eh to the extent required, typically at least 100 mV, to make the nickel bearing sulphides in the stream less hydrophobic to the extent necessary to allow guar to coat on talc particles rather than on particles of nickel bearing sulphides, thereby depressing the flotation characteristics of the talc particles.

In addition, subsequently processing the stream in flotation cells, in the presence of air (which acts as an oxidising agent) has the effect of increasing the Eh of the stream whereby the nickel bearing sulphides float and form a concentrate.

The concentrate from the rougher cells 51 is pumped to the front-end cleaner circuit 13.

Tailings from the rougher cells 51 are first pre-treated by adjusting the Eh of the stream by the addition of sodium dithionite and then processed in scavenger flotation cells 55 at high density in the presence of sulphuric acid and guar as described above.

Tailings from the scavenger cells 55 are pumped to a tailings thickener 57.

The concentrate from the scavenger cells 55 is pumped to a Tower mill 81 and re-ground in the mill to a P80 of 60 μm.

The re-ground concentrate is then supplied to the back-end cleaner circuit 15.

Fines Particles Flotation Stage 11

The fines underflow stream from the cyclone 7 is pre-treated by adjusting the Eh of the stream by the addition of sodium dithionite and then floated at low density in rougher cells 61 in the presence of sulphuric acid, citric acid, and guar as described above.

The concentrate from the first group of the rougher cells 61 is pumped to the front-end cleaner circuit 13.

The concentrate from the last group of the rougher cells 61 is pumped to the back-end cleaner circuit 15.

Tailings from the rougher cells 61 are pumped to a tailings thickener 79.

Front End Cleaner Circuit 13

The concentrate from the rougher cells 51 of the coarse particles flotation stage 9 is pumped to a cyclone cluster 17 ahead of a flash flotation cell 19.

Overflow from the cyclone cluster 17, having a P80 of 35 μm, is pumped to a cleaner cell 21 and cleaned in the presence of a combination of reagents including sulphuric acid and guar.

In addition, the above-mentioned concentrate from the first group of cells in the fine particles flotation stage 11 is pumped to the cleaner cell 21 and is also cleaned in the presence of a combination of reagents including sulphuric acid and guar.

Underflow from the cyclone cluster 17 is fed to the flash flotation cell 19.

Concentrates from (i) the flash cell 19 and (ii) the cleaner cell 21 are fed to a re-cleaner cell 23 and are cleaned in the presence of a combination of reagents including sulphuric acid and guar.

A nickel sulphide product stream is produced in the re-cleaner cell 23 and is fed to a thickener 49.

Tailings from the flash flotation cell 19 gravitate to a Tower mill 25 and are re-ground to a nominal P80 of 35 microns.

Product from the Tower mill 25 is fed to the cyclone cluster 17 and is processed as described above.

Tailings from the re-cleaner cell 23 are supplied to the cleaner cell 21 and are processed in the cleaner.

Tailings from the cleaner cell 21 are pumped to the back-end cleaner circuit 15.

Back-end Cleaner Circuit 15

The back-end cleaner circuit 15 processes a flotation concentrate derived from (i) the concentrate from the scavenger cells 55 of the coarse particles flotation stage 9, (ii) the concentrate from the last group of rougher cells in the fine particles flotation stage 11, and (iii) tailings from the front end cleaner 13.

These streams are pumped initially to cells in a scavenger stage 29 upstream of the of the back-end cleaner circuit 15.

The concentrate from the scavenger stage 29 is pumped to a cyclone cluster 31.

Overflow from cyclone cluster 31, with a P80 of 25 μm, is pumped to a cleaner cell 35 and is cleaned in the presence of a combination of reagents including sulphuric acid and guar.

The concentrate from the cleaner cell 35 is pumped to a cleaner cell 37 and is cleaned again in the presence of a combination of reagents including acid and guar.

Tailings from the cleaner cell 35 are pumped to a tailings thickener 41.

A nickel sulphide product stream is produced in the cleaner cell 37 and is fed to a thickener 43.

Tailings from the cleaner cell 37 are recycled to the cleaner cell 35.

Underflow from cyclone cluster 31 gravitates back to the Tower mill 33 for additional re-grinding to a P80 of 25 μm. The mill discharge is pumped back to the cyclone cluster 31.

One of the objectives when designing the embodiment of the flowsheet of the method of the present invention shown in the FIGURE was to minimize recycles because of the natural floatability of talc particles. The inclusion of the back end cleaner 15, which is separate to the front-end cleaner 13, allows concentrate grade targets to be met without the need for recycling to the front end cleaner. The further stage of re-grinding ahead of the 'back-end' cleaner 15 is also beneficial.

Dithionite

An important feature of the method of the present invention is Eh adjustment, namely lowering the Eh of process streams prior to supplying the streams to flotation cells and raising the Eh after selectively coating talc particles and not nickel sulphide particles.

As is described above, this Eh adjustment makes nickel sulphide ores less hydrophobic compared to talc particles, with a result that guar selectively coats on talc rather than on nickel sulphide particles.

Subsequently raising the Eh, for example by adding air in flotation cells, raises the Eh and improves the flotability of nickel sulphide minerals and allows nickel sulphide ores to float selectively, with the talc particles remaining in the process streams.

Sequential Re-grinding.

It was shown in laboratory work that re-grinding the tailings from the front-end cleaner 13 and the concentrate from the scavenger cells 55 of the coarse particles flotation stage 9 is beneficial to the subsequent flotation response of these streams by reducing the amount of talc that is subsequently floated with nickel bearing sulphides.

Sulphuric Acid

The applicant has found in laboratory work that the addition of sulphuric acid in combination with guar improves the flotation rate of nickel bearing sulphides relative to talc particles across the entire particle size range of interest for the method.

The laboratory work found that the optimum pH is about 4.5 and lower pH values require much greater acid additions and provide no further metallurgical improvements.

The laboratory work found that a step change in performance is clearly evident when sulphuric acid is added to give a flotation pH of 4.5. By way of example, the laboratory work found that, for a target concentrate grade of 14% Ni (0.5% MgO recovery), adding sulphuric acid raises recovery by approximately 15%.

In addition, the laboratory work found that, by comparison with a conventional flowsheet, the method of the present invention requires between 20 and 25% less sulphuric acid.

In addition, the laboratory work found that the addition of dithionite and citric acid in combination with sulphuric acid to pH 7 is as effective as adding sulphuric acid to pH 4.5 for the fines rougher stage 11. The finding that dithionite and citric acid can partially substitute for sulphuric acid in fine rougher-scavenger flotation is an important result. Such a substitution can reduce sulphuric acid consumptions by between 40 and 50%.

Guar

Over a number of years of processing and testing talcose ores, a diversity of talc depressants have been evaluated.

These depressants include a variety of different guars, including chemically modified guars, polysaccharides such as dextrin, and synthetically manufactured polymers containing a variety of different functional groups.

Despite a great deal of work, guar has remained the depressant of choice for the method of the present invention.

Laboratory work carried out by the applicant has identified two important findings relevant to the preparation of guar.

The first finding is that guar prepared and added at a concentration of 0.5% produces the same response as guar prepared and added at a concentration of 0.25%.

The second finding is that guar prepared in hypersaline water gives the same response as guar prepared in sub-potable water.

Xanthate

The preferred collector is sodium ethyl xanthate.

Rougher Stages

One of the objectives when designing the method of the present invention was to minimize recycles because of the natural floatability of talc particles. Therefore, the flowsheet includes separate rougher stages for the coarse and fines particles streams and open circuit stages, i.e. no recycling of concentrate or tailings to rougher cells.

The laboratory and pilot plant work carried out to date indicates that the method of the present invention is very effective in selectively separating nickel bearing sulphides from talcose ores.

Many modifications may be made to the embodiment of the method of the present invention described above without departing from the spirit and scope of the invention.

By way of example, whilst the above description refers to particular particle sizes in the re-grinding stages, the present invention is not so limited and extends to any suitable particle sizes.

By way of further example, whilst the above description refers to sodium dithionite as the reducing agent, the present invention is not so limited and extends to any suitable reducing agent.

By way of further example, whilst the above description refers to air as the oxidising agent, the present invention is not so limited and extends to any suitable oxidising agent.

By way of further example, whilst the above description refers to guar as the surface modifying agent, the present invention is not so limited and extends to any suitable surface modifying agent.

By way of further example, whilst the above description refers to the use of Tower mills to re-grind particles in process streams, the present invention is not so limited and extends to the use of any suitable grinding apparatus.

The invention claimed is:

1. A method of separating nickel bearing sulphides from mined ores or concentrates of mined ores that contain talc particles, the method comprising at least one flotation stage comprising decreasing an Eh of a slurry of mined ores or concentrates of mined ores by adding a reducing agent and making particles of nickel bearing sulphides in the ores or concentrates less hydrophobic than talc particles in the ores or concentrates, adding a surface modifying agent to the slurry to coat the talc particles and not nickel bearing sulphide particles with the surface modifying agent, to cause water particles to attach to the coated talc to depress floatability of the talc particles; the flotation stage including the step of increasing the Eh of the slurry after the addition of the surface modifying agent to the slurry, making particles of nickel bearing sulphides more hydrophobic and thereby improve the floatability of the nickel bearing particles.

2. The method defined in claim 1 wherein the step of adding the surface modifying agent to the slurry comprises adding an acid with the surface modifying agent to adjust the pH of the slurry.

3. The method defined in claim 1 wherein the reducing agent is an oxy-sulphur compound which dissociates in the slurry to form oxy-sulphur ions having the general formulae:

$$S_nO_y^{z-}$$

where n is greater than 1, y is greater than 2, and z is the valence of the ion.

4. The method of claim 3 wherein the reducing agent is sodium dithionite.

5. The method defined in claim 1 wherein the decreasing the Eh of the slurry includes decreasing the Eh of the slurry by at least 100 mV.

6. The method defined in claim 1 wherein the increasing the Eh of the slurry includes supplying an oxidizing agent to the slurry.

7. The method defined in claim 6 wherein the oxidizing agent is an oxygen-containing gas.

8. The method defined in claim 1 wherein the increasing the Eh of the slurry includes increasing the Eh of the slurry by at least 100 mV.

9. The method defined in claim 1 further comprising separating the slurry on the basis of particle size into a coarse particles stream and a fines particles stream and processing each process stream in the flotation stage whereby the method comprises a coarse particles flotation stage and a fines particles flotation stage.

10. The method defined in claim 9 comprising sequentially grinding particles, in at least one of the process streams.

11. The method defined in claim 9 comprising cleaning a concentrate stream from rougher cells of the coarse particles flotation stage in a front end cleaning circuit.

12. The method defined in claim 11 further comprising grinding particles in the concentrate stream from rougher cells of the coarse particles flotation stage prior to cleaning the concentrate stream in the front end cleaning circuit.

13. The method defined in claim 11 further comprising cleaning a first part of a concentrate stream from rougher cells of the fines particles flotation stage in the front end cleaning circuit.

14. The method defined in claim 13 comprises cleaning a second part of the concentrate from rougher cells of the fines particles flotation stage in a back-end cleaning circuit.

15. The method defined in claim 14 comprises cleaning a tailings stream from scavenger cells of the coarse particles flotation stage in the back end cleaning circuit.

16. The method of claim 15 comprising grinding particles in the concentrate stream from scavenger cells of the coarse particles flotation stage prior to cleaning the concentrate stream in the back end cleaning circuit.

17. The method defined in claim 14 comprising grinding in the back-end cleaning circuit a concentrate derived from any one or more of (i) the second part of the concentrate from rougher cells of the fines particles flotation stage, (ii) the tailings stream from scavenger cells of the coarse particles flotation stage, and (iii) the tailings stream from the front-end cleaning circuit prior to cleaning the concentrate in the back-end cleaning circuit.

18. The method of claim 14 comprising cleaning a tailings stream from the front-end cleaning circuit in the back-end cleaning circuit.

19. The method of claim 9 comprising processing the coarse particles process stream and the fines particles process stream from the respective flotation stages in at least one cleaner circuit.

20. The method of claim 9 comprising processing the coarse particles process stream and the fines particles process stream in separate rougher stages with no recycling of concentrate or tailings to rougher cells.

* * * * *